United States Patent [19]

Diederich, Jr.

[11] 4,335,688

[45] Jun. 22, 1982

[54] COUPLING ADAPTER FOR FLUID COOLING AND FILTERING

[76] Inventor: Paul W. Diederich, Jr., 633 Hunters Trail, Glendora, Calif. 91740

[21] Appl. No.: 186,433

[22] Filed: Sep. 12, 1980

[51] Int. Cl.³ .............................................. F01M 1/00
[52] U.S. Cl. ................................ 123/196 A; 137/110; 137/269; 137/599.1; 123/196 AB; 220/287; 236/93 A; 236/99 J; 210/181; 210/184; 184/104 B
[58] Field of Search ............. 137/110, 269, 271, 599.1; 210/181, 184; 236/93 A, 99 J; 123/196 A, 196 AB; 184/104 B, 6.22, 6.24; 251/DIG. 1; 220/287

[56] References Cited

U.S. PATENT DOCUMENTS

| | | | |
|---|---|---|---|
| 2,007,805 | 7/1935 | Lippert | 220/287 |
| 2,524,798 | 10/1950 | Hoskinson | 123/196 AB |
| 2,736,536 | 2/1956 | Banowitz | 220/287 X |
| 3,463,317 | 8/1969 | Prier | 210/181 |
| 3,482,699 | 12/1969 | Kauffman | 210/184 |
| 3,929,643 | 12/1975 | Donaldson | 210/181 X |
| 4,193,442 | 3/1980 | Vian | 123/196 AB |

*Primary Examiner*—Harold W. Weakley
*Attorney, Agent, or Firm*—B. F. Spencer

[57] ABSTRACT

A coupling adapter is disclosed for coupling a remotely-located fluid circulation device and a fluid filter to the fluid reservoir of an engine, transmission unit or other hydraulic system in place of a standard spin-on fluid filter. The adapter consists of a disk-shaped body having first and second spaced-apart end surfaces. First and second cylindrically-shaped cavities extend partially into the disk-shaped body, respectively, from the first and second end surfaces. A plurality of concentric ridges intersticed with concentric grooves is provided in the first end surface surrounding the first cylindrically-shaped cavity. A central wall section within the disk-shaped body separates the first and second cavities. A central bore extends coaxially through the central wall section for receiving and supporting a hollow nipple adapted to align and secure the coupling adapter to the fluid reservoir. A spin-on fluid filter is adapted for attachment to the second end surface upon threaded engagement with the hollow nipple. Spaced-apart outlet and inlet ports extend, respectively, into the first and second cavities from the outer peripheral surface of the disk-shaped body. Fluid flowing from the reservoir into the first cavity is conveyed through the outlet port to a remotely-located fluid circulation device and then returned through the inlet port to the second cavity prior to filtering by the fluid filter. A valve, which may be thermally responsive, is located within the central wall section for controlling the flow of fluid within the adapter.

8 Claims, 6 Drawing Figures

COUPLING ADAPTER FOR FLUID COOLING AND FILTERING

BACKGROUND OF THE INVENTION

The present invention relates to coupling adapters for use in the cooling and filtering of fluids, and, in particular, to a coupling adapter for coupling a fluid filter and a remotely-located fluid circulation device to the fluid reservoir of a hydraulic system.

Coupling adapters for coupling fluid filters and fluid circulation devices, such as heat exchangers or oil coolers, to a hydraulic system are well known in the art. These units find wide use in a variety of types of vehicles and engines for filtering and cooling transmission fluid and lubricating oil.

One such device, disclosed in U.S. Pat. No. 2,068,395 and referred to therein as a base casting, includes an upper flat, trapezoidal flange member and a lower grooved, circular flange member formed as by casting. A horizontally-extending bore passes through the base casting for receiving a stud bolt for securing the casting to the block of an engine. A heat exchanger is mounted atop the base casting upon the upper flat trapezoidal flange member. A cylindrically-shaped fluid filter element is secured to the lower grooved, circular flange member. Lubricating oil to be cooled and filtered passes from the engine into one side of the base casting where it is deflected upward into the heat exchanger. After passing through the heat exchanger, the oil returns back into the base casting. The cooled lubricating oil then passes through the base casting into the inner peripheral, cylindrical surface of the fluid filter where it is filtered. Filtered oil passes upward through the center of the fluid filter into the horizontally-extending bore of the base casting. From the horizontally-extending bore, the filtered oil is routed through a different section of the base casting to an outlet bore and then back into the engine. The base casting is provided with a pair of spring-loaded ball relief valves, one for by-passing the oil flow around the heat exchanger and the other for by-passing the oil flow around the fluid filter in the event the resistance of the flow through either the heat exchanger or the fluid filter becomes too great.

Another type of adapter for fluid cooling and filtering is disclosed in U.S. Pat. No. 3,463,317 and is referred to therein as adapter D. This adapter is designed for attachment to the fluid casing of a hydraulic system in place of a spin-on type fluid filter. The adapter is provided with an upper flat surface for abutment adjacent the outlet surface of the fluid casing. A central bore extends through the adapter for receiving a hollow, threaded nipple. The lower surface of the adapter includes a crescent-shaped recess partially surrounding the central bore. Two closely-spaced ports extend laterally from the side of the adapter for hose connection to a remotely-located fluid cooling element. One port extends through an L-shaped bend within the adapter to an opening through the upper flat surface to receive the fluid from the circular well of the fluid casing of the hydraulic system. The other port extends into the crescent-shaped recess within the lower surface of the adapter. A spin-on fluid filter attached to the lower end of the threaded nipple secures the filter to the lower surface of the adapter. Fluid to be cooled and filtered passes from the circular well of the fluid casing through the L-shaped port of the adapter to the remotely-located cooler element. The cooled fluid flows from the cooler element back to the other port of the adapter and into the crescent-shaped recess. The fluid then flows from the recess into the inner peripheral surface of the filter. Filtered fluid passes up through the center of the filter and through the hollow nipple back into the hydraulic system.

An additional type of adapter, similar in part to that of U.S. Pat. No. 3,463,317 employs a disk-shaped body having generally flat upper and lower surfaces. The upper surface includes a D-shaped recess or cavity. The lower surface includes a D-shaped recess separated from the D-shaped recess in the upper surface. A central bore extends through the disk-shaped adapter for receiving a hollow, threaded nipple. Two closely-spaced parallel ports pass through the side wall of the adapter, one extending into the upper D-shaped recess and the other into the lower D-shaped recess. A spin-on filter may be secured to the lower surface of the adapter by threaded attachment to the lower end of the hollow nipple. The upper threaded end of the nipple attaches the adapter with the spin-on filter to the fluid casing or reservoir of the hydraulic system. One version of this type of coupling adapter includes a ball and spring valve internally located within the adapter and situated between the two D-shaped recesses at a position diametrically disposed from the two ports.

The above briefly-described adapters possess a number of disadvantages and limitations which the present invention is intended to overcome. Foremost among these limitations is the number of turns or bends the fluid must undergo while passing through the adapter on its way to the cooling and filtering elements and the number of restricted areas, through which, and barriers, around which, the fluid must pass before re-entering the hydraulic system. These prior art adapters are seriously limited as to the types and sizes of fluid reservoirs to which they may be attached, as well as to the types and sizes of fluid filters with which they may be used. Additionally, these prior art adapters are limited in the manner in which they may be installed and coupled to fluid-cooling devices as a result of their design and geometric configuration. Finally, these prior art adapters do not provide, nor do they lend themselves to, the inclusion of a temperature-responsive valve system for by-passing the cooling path when the temperature of the fluid is relatively low.

Accordingly, a principal object of the present invention is to provide an improved coupling adapter having an increased and unrestricted flow of fluid through its internal passageways.

Another object is to provide a coupling adapter for coupling a variety of different types and sizes of fluid filters and remote fluid circulation devices to the fluid reservoir of a hydraulic system.

Still another object is to provide a coupling adapter for inter-coupling between a fluid reservoir of one size and a fluid filter of a size larger than that which the fluid reservoir was designed to receive.

An additional object is to provide a coupling adapter having increased spacing between ports for achieving unobstructed fluid flow into and out of the adapter and enabling a variety of types of fittings to be employed in coupling the adapter to a remotely-located fluid circulation device.

Yet another object is to provide a coupling adapter having an improved pressure-responsive valve for controlling the flow of fluid within the adpater.

A further object is to provide a coupling adapter having a thermally-responsive valve for regulating the flow of fluid according to its temperature.

Another object is to provide a universal coupling adapter that is useable with different sizes of fluid reservoir housings.

DESCRIPTION OF THE INVENTION

Figure 1:
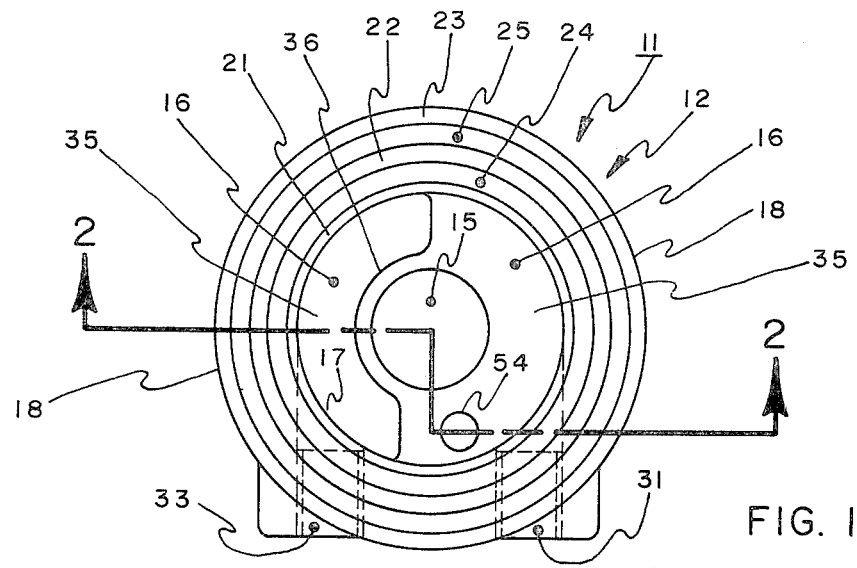
FIG. 1 is a top view of the preferred embodiment of the coupling adapter of the invention.
Figure 2:
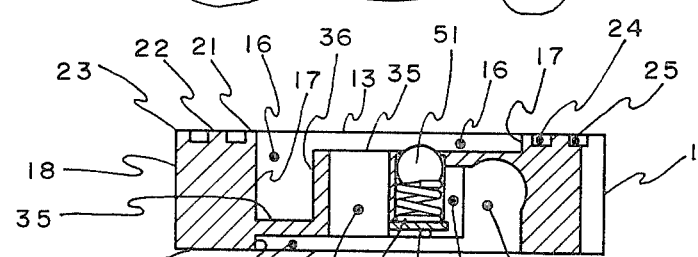
FIG. 2 is a side sectional view of the adapter of FIG. 1 taken along the lines 2—2.

Referring to FIGS. 1 and 2, the improved coupling adapter 11 consists of a generally disk-shaped body 12 having an upper or first end surface 13 and a lower or second end surface 14. A smooth, central bore 15 extends coaxially through adapter 11 between the first and second end surfaces 13 and 14.

A first annular or cylindrically-shaped cavity 16 extends partially into disk-shaped body 12 from first end surface 13 and surrounds central bore 15. The outer diameter of cavity 16 is smaller than the diameter of body 12, as shown. The portion of first end surface 13 between the outer peripheral surface 17 of cavity 16 and the outside surface 18 of disk-shaped body 12 is provided with three concentric ridges 21, 22 and 23 of different diameters. The first or innermost ridge 21 is situated adjacent the outer peripheral surface 17 of cavity 16, and the third or outermost ridge 23 is adjacent the outside surface 18 of body 12.

An inner circular groove 24, extending partially into first end surface 13, is situated between the first or innermost ridge 21 and the second ridge 22. An outer circular groove 25 of larger diameter, and extending partially into first end surface 13, is situated between second ridge 22 and the third or outermost ridge 23. Circular grooves 24 and 25 are adapted for receiving compressible gaskets or O-rings (not shown) in order to secure a fluid-tight coupling between first end surface 13 and the outlet face or surface of the fluid reservoir housing of a hydraulic system. The three circular ridges 21, 22 and 23 with intersticed grooves 24 and 25 in first end surface 13 are similar to those disclosed in co-pending application Ser. No. 87,101, filed Oct. 22, 1979, now U.S. Pat. No. 4,278,275.

The provision of both an inner circular groove 24, with its adjacent ridges 21 and 22, and an outer circular groove 25, with its adjacent ridges 22 and 23, enables the adapter of this invention to be used with fluid reservoirs of different diameter sizes. For example, if the fluid reservoir of the hydraulic system for which the adapter is to be used is designed to receive a spin-on type fluid filter employing an O-ring gasket having a diameter equal to that of circular groove 24, then a single such O-ring or gasket of this diameter size is placed within the circular groove 24. On the other hand, should the fluid reservoir of the hydraulic system be of such diameter size as to require a spin-on type fluid filter having a larger diameter size or of such a size as would require a gasket or O-ring of larger diameter, then the circular groove 25 of adapter 11 would be provided with a single such O-ring. It is not necessary, therefore, that both circular grooves 24 and 25 be provided with O-rings to achieve a fluid-tight seal between first end surface 13 and the fluid reservoir with which the adapter 11 is to be used.

Figure 4:
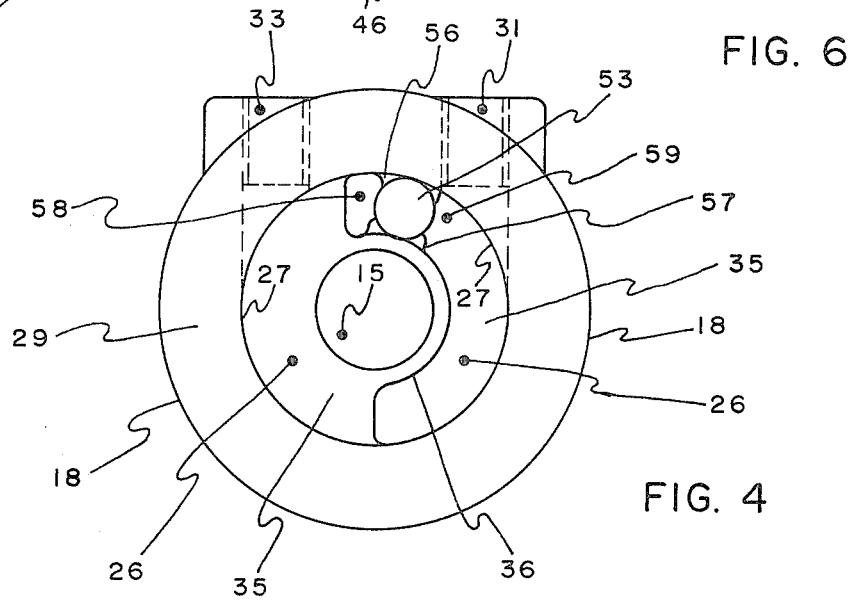
FIG. 4 is a bottom view of the coupling adapter of FIGS. 1 and 2.

A second annular or cylindrically-shaped cavity 26 extends partially into disk-shaped body 12 from second end surface 14 and surrounds central bore 15, as seen in FIGS. 2 and 4. The outer diameter of second cavity 26 is smaller than the diameter of body 12. The portion 29 of second end surface 14 between the outer peripheral surface 27 of cavity 26 and the outside surface 18 of body 12 is smooth and flat. This portion 29 serves as a landing or face against which a fluid-tight seal is achieved upon installation of a conventional spin-on type fluid filter.

The width of the landing or face portion 29 is sufficient to receive spin-on type fluid filters of at least two different diameter sizes. Additionally, landing portion 29 is capable of receiving fluid filters of the same diameter but of different types, such as those which possess different diameter size sealing gaskets or O-rings. For example, one popular diameter size spin-on fluid filter is available with either of two different diameter gaskets or O-rings, one providing a gasket of approximately seven centimeters in outside diameter and the other slightly larger than nine centimeters in outside diameter. Additionally, these popular fluid filters are also provided with different diameter threaded bores. The improved coupling adapter of this invention is designed to accommodate either of these different gasket and threaded bore sizes. Accordingly, a variety of different diameter sizes, as well as gasket and threaded bore sizes, of conventional filters may be attached to the coupling adapter 11 of this invention.

Adapter 11 is provided with two spaced-apart, parallel cylindrical ports 31 and 33 as shown in FIGS. 1 and 4. Outlet port 33 with its passageway extends from the outside surface 18 of body 12 into first cavity 16. Inlet port 31 with passageway extends from outside surface 18 of body 12 into second cavity 26. The passageways of outlet and inlet ports 33 and 31 provide a straight and unobstructed entry into their respective cavities 16 and 26. This is achieved by selecting both the diameter of the ports and the lateral spacing between them to match the size of the cavities with which they interconnect. Thus, the spacing between the outermost wall portion of cylindrical port 33 and the outermost wall portion of cylindrical port 31 is substantially equal to the outside diameter of cavities 16 and 26, as seen in FIGS. 2 and 4. The distance between the innermost wall portion of cylindrical port 33 and the innermost wall portion of cylindrical port 31 is larger than the diameter of bore 15, as seen in FIGS. 1 and 4.

The outlet and inlet ports 33, 31 may be threaded, as shown, to receive standard pipe fittings if desired, or may be provided with barbed extensions for use with rubber hose with hose clamps. The increased lateral spacing between outlet and inlet ports 33, 31 makes it possible to employ elbow or 90-degree standard pipe fittings, thereby enabling the improved coupling adapter to be used in a number of installations not heretofore possible.

The two cylindrically-shaped cavities 16 and 26 are separated by a central wall section 35, as seen in FIG. 2. Wall section 35 forms an integral part of disk-shaped body 12, surrounds the central bore 15, and serves to prevent fluid from flowing between the two cavities. The central wall section 35 is best described as being that section of disk-shaped body 12 which forms the bottom surface of first cavity 16, and, similarly, forms the top surface of second cavity 26. The depth of first cavity 16, as it extends into disk-shaped body 12 from first end surface 13, is not uniform, as seen in FIG. 4. Similarly, the depth of second cavity 26 into body 12 from second end surface 14 is not uniform. Thus, central wall section 35 does not possess the shape of a flat, annular disk but rather that of two semicircular disk portions spaced apart in elevation and joined by cylindrical wall section 36.

Figures 3, 5, 6:
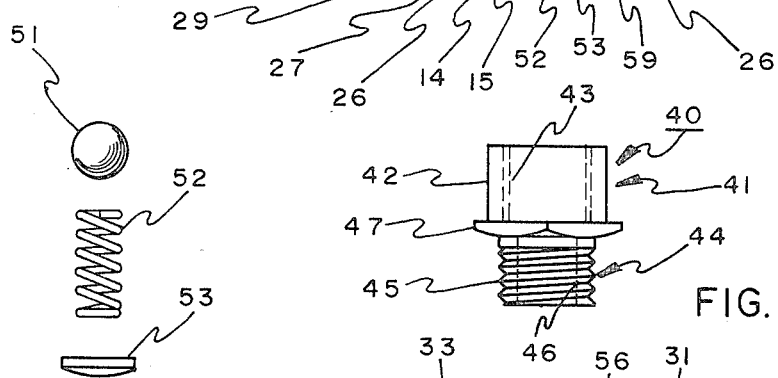
FIG. 3 is a side view of a preferred hollow, threaded nipple connector for aligning and securing the adapter to the fluid reservoir of a hydraulic system.
FIG. 5 is a view of the ball valve, coil spring and circular disk prior to installation within the adpater.
FIG. 6 is a side view of a thermally-responsive element that may be employed instead of the coil spring of FIGS. 2 and 5.

The hollow, threaded nipple connector 40 of FIG. 3 consists of an upper cylindrical portion 41 having a smooth outer surface 42 and a threaded inner cylindrical surface 43. The lower cylindrical portion 44 has a threaded outer surface 45 and a smooth inner cylindrical surface 46. A hexagonal-shaped nut 47 formed as an integral part of the nipple is located between the upper and lower cylindrical portions.

The upper cylindrical portion 41 is dimensioned to pass freely into and through bore 15 of adapter 11. The inner threaded surface 43 is adapted for screw-on attachment to the protruding nipple extending from the fluid reservoir of a hydraulic system. Nipple 40 serves to align and secure adapter 11 to the fluid reservoir housing.

The hexagonal-shaped nut 47 is provided to receive a standard wrench for tightening nipple 40 to secure a fluid-tight coupling between the upper end surface 13 of the adapter and the fluid reservoir housing. The upper flat surface of nut 47 bears upon the lower surface of central wall section 35 that surrounds central bore 15.

A conventional spin-on fluid filter, with gasket in place, is secured to adapter 11 by threadably engaging the filter upon the outer threaded surface 45 of lower portion 44 of nipple 40. By tightly screwing the spin-on fluid filter onto the threaded nipple, the sealing gasket of the filter is brought to bear upon the smooth, flat landing portion 29 to achieve a fluid-tight coupling.

The improved coupling adapter described above is useable with a variety of types and sizes of spin-on fluid filters, may be attached to fluid reservoirs of different types and sizes, provides an increased and unrestricted flow of fluid through its internal passageways, and is useable with a variety of types of remotely-located fluid cooling devices.

The improved coupling adapter is capable of receiving a fluid filter of larger size than that which the fluid reservoir may have been designed to receive. For example, if the fluid reservoir is designed to receive a spin-on fluid filter of small diameter size and, thus, would require a sealing gasket of diameter equal to that of inner groove 24, the improved coupling adapter may be readily secured to such fluid reservoir in the manner described above. However, since the flat, smooth landing 29 of the adapter is of sufficient width of receive two different diameter sizes of conventional fluid filters, the user may elect to install upon adapter 11 a larger size spin-on fluid filter whose sealing gasket would be too large for use directly with the fluid reservoir of the engine or hydraulic system.

With coupling adapter 11 installed as outlined above, fluid from the fluid reservoir housing of the hydraulic system flows into upper cavity 16 and out through outlet port 33. From outlet port 33 the fluid flows through a suitable hose (not shown) to a remotely-located fluid cooler or radiator. The cooled fluid then flows from the outlet of the cooler or radiator through a hose into inlet port 31 and lower cavity 26. From lower cavity 26, the fluid flows into the conventional spin-on fluid filter. Filtered fluid flows up into and through hollow nipple 40 into the fluid circulation system of the engine or hydraulic unit.

In addition to the above improvements, the coupling adapter of this invention is provided with an improved internal valve system that is responsive to the pressure of the fluid, the temperature of the fluid, or to both pressure and temperature. Referring to FIG. 5, there is shown, in vertical separation, a spherical steel ball 51, a coil spring 52, and a curved, circular disk 53. These elements, when installed within adapter 11 as illustrated in FIGS. 1, 2 and 4, provide a valve system for regulating the flow of fluid between the first and second cylindrically-shaped cavities 16 and 26.

Referring to FIG. 1, a small circular opening 54 passes through the central wall section 35 at a position approximately midway between outlet and inlet ports 33 and 31. Circular opening 54 is situated between the outer diameter wall portion 17 of first cavity 16 and central bore 15. The diameter of circular opening 54 is less than the diameter of ball 51. The under surface below circular opening 54 is conical to provide a sealing fit with the upper or top surface of the ball 51 to close opening 54. The ball 51 with spring 52 and circular disk 53 is positioned within a portion of second cylindrically-shaped cavity 26, as illustrated in FIG. 4. In the installed position, ball 51 closes and seals circular opening 54 by virtue of the force of compressed coil spring 52.

Ball 51, coil spring 52 and circular disk 53 are retained within a cylindrically-shaped opening, the axis of which is parallel to and laterally displaced from the axis of bore 15. The cylindrically-shaped opening is bounded on one side by curved portion 56 extending inwardly from the side wall 27 of second cavity 26 and by a second curved portion 57 extending outwardly from the part of central wall section 35 that surrounds bore 15, as seen in FIG. 4. Thus, except for the topmost portion of ball 51 where it seats with circular opening 54, the ball 51 with compressed coil spring 52 and circular disk 53 lies wholly within the second cylindrically-shaped cavity 26. The curved, circular disk 53 is wedged or swaged between the lower sides of curved portions 56 and 57. This is achieved upon striking the center of the curved disk with a force sufficient to render the curved, circular disk flat, as illustrated in FIG. 2, thereby retaining ball 51 with compressed coil spring 52 and disk 53 in an installed position.

The cylindrically-shaped opening, within which ball 51 and coil spring 52 are retained, is slightly larger than the diameter of ball 51 and spring 52 to permit freedom of travel of the ball and spring in an axial direction. The sides of the cylindrically-shaped opening lying between curved portion 56 and second curved portion 57 open into second cavity 26 at positions 58 and 59, as seen in FIG. 4. This feature permits fluid, when under pressure, to pass from upper cavity 16 through circular opening 54 and over the top surface of ball 51 into second cavity 26 at both positions 58 and 59. As a result, fluid passing through circular opening 54 is free to flow between positions 58 and 59 as well as through the space between the turns of coil spring 52, thereby providing an increased passageway into cavity 26.

The internal valve system of the adapter of this invention as described above is responsive to the pressure of the fluid when, in operation, fluid pressure builds up within first cylindrically-shaped cavity 16. When the pressure of the fluid within cavity 16 exceeds that amount necessary to keep the valve system closed, the heavy pressure of the fluid upon the top surface of ball 51 will cause coil spring 52 to become further compressed, thereby allowing fluid to pass through the circular opening 54 around ball 51 into second cavity 26 at positions 58 and 59. This condition may occur, for example, should a blockage or restriction occur within the path of fluid flow from the outlet port 33 through a remotely-located fluid cooling device and back to inlet port 31. This condition also may occur when the viscosity of the fluid is relatively low, due either to the improper choice of fluid or to the low temperature of the fluid. In either case, the valve system is capable of providing pressure relief by passing a portion of the fluid from first cavity 16 into second cavity 26 through the circular opening 54. The improved valve system allows an increase in the flow of fluid into second cavity 26 by virtue of the cylindrically-shaped opening at positions 58 and 59.

A further improvement is achieved by the improved adapter of this invention by replacing the conventional coil spring 52 of the valve system with a temperature-responsive spring element, such as sealed, air-tight bellows spring, bi-metallic spring or a thermally-extendible cartridge or capsule. One suitable type of thermally-extendible cartridge, containing an expandable salt, is employed within the conventional automobile radiator thermostat.

FIG. 6 illustrated a representative type of thermally-responsive and expandable element in the form of a sealed bellows 61. Bellows 61 includes a corrugated-like central section 62 with a closed flat lower end 63 and a concave upper disk member 64 for receiving and supporting a ball. Bellows 61 may be installed in place of coil spring 52 in a manner somewhat similar to that described above.

An additional improvement is achieved with the present invention by installing bellows spring 61 in such manner that the valve system is left in a partially open position with ball 51 either lightly touching the circular opening 54 or not touching it at all. Under this condition, fluid within cavity 16 under a reduced or lower pressure is free to flow through opening 54 and around ball 51 into second cavity 26. The flow of fluid through outlet port 33 to an external fluid cooling device is thereby reduced. Thus, a fast warmup of the temperature of the fluid may be achieved in an engine or transmission system upon start-up when cooling of the fluid is wholly unnecessary. This feature is of considerable importance in the operation of hydraulic systems in cold climates. Accordingly, as the temperature of the fluid begins to rise, and its viscosity tends to increase, the temperature-responsive bellows spring 61 will begin to expand, thereby increasing the upward force upon ball 51. Increased force upon ball 51 will reduce the amount of fluid passing between the first and second cavities 16 and 26 by way of circular opening 54. Upon further increases in the temperature of the fluid, when cooling becomes desirable or necessary, the bellows spring 61 further expands, thereby providing increased force upon ball 51 by an amount sufficient to close circular opening 54. Thereafter, the fluid in cavity 16 will flow out through outlet port 33, on through the remote cooling element and back into the adapter through inlet port 31.

By virtue of the improved flow of fluid over the top of ball 51 and into cavity 26 at both positions 58 and 59, improved thermal coupling is achieved between the fluid and the surface of bellows spring 61. This improved thermal coupling assures uniform and prompt response of bellows spring 61 to changes in the temperature of the fluid.

The disk-shaped body 12 of adapter 11 is manufactured, as by molding, as an integral unit preferably composed of aluminum, brass or other suitable material. Coil spring 52 is conventionally manufactured from spring steel, and ball 51 may be a steel ball bearing. In one representative embodiment, a ball 51 having a diameter of 9.5 millimeters was used together with a coil spring having an inner diameter of 7 millimeters and an outer diameter of 9.5 millimeters. The uncompressed length of the coil spring is approximately 15 millimeters. Thermally-responsive bellows spring 61 may be composed of stainless steel, brass or phosphor bronze, and a representative embodiment has an inner diameter of 5 millimeters, an outer diameter of 9.5 millimeters and an uncompressed length of approximately 12 millimeters.

It is apparent that the threaded nipple connector 40 may be manufactured with a variety of different diameters as well as different thread and pitch sizes, either within upper cylindrical portion 41 or upon the outer threaded surface 45 of lower portion 44, to accommodate different types and sizes of fluid reservoir outlets and fluid filters without departing from the scope of the invention.

Since many changes can be made in the above-described apparatus and many different embodiments of this invention could be made without departing from the scope thereof, it is intended that all matter contained in the above description or shown in the accompanying drawings shall be interpreted as illustrative and not in a limiting sense.

What is claimed is:

1. A coupling adapter for attachment to the fluid reservoir of a hydraulic system for coupling a fluid filter and a remotely located fluid circulation device to the hydraulic system, comprising in combination:
   (a) a generally disk-shaped body having first and second spaced-apart end surfaces, the first end surface being adapted for abutment adjacent the outlet surface of the fluid reservoir in place of a fluid filter, the second end surface being adapted for abutment adjacent the end surface of a fluid filter;
   (b) a first cylindrically-shaped cavity extending partially into said disk-shaped body from said first end surface;
   (c) first, second and third spaced-apart concentric ridges of different diameters formed at the first end surface of said disk-shaped body, said first ridge being adjacent to the outer peripheral surface of said first cavity, said third ridge being adjacent to the outer peripheral surface of said disk-shaped body, said second ridge being located in-between said first and second ridges;
   (d) an inner circular groove situated between said first and second concentric ridges and extending partially into said disk-shaped body from the first end surface;

(e) an outer circular groove situated between said second and third concentric ridges and extending partially into said disk body from the first end surface, one of said inner or outer circular grooves being adapted for receiving a single O-ring for providing a fluid-tight seal between the first end surface of said disk-shaped body and the outlet surface of the fluid reservoir, said inner circular groove receiving an O-ring when the adapter is to be used with a fluid reservoir whose outlet surface is of a first diameter size, said outer circular groove receiving an O-ring of larger diameter when the adapter is to be used with a fluid reservoir whose outlet surface is of a second and larger diameter size;

(f) a second cylindrically-shaped cavity extending partially into said disk-shaped body from the second end surface, the second end surface of said disk-shaped body adapted for abutment adjacent the end surface of a fluid filter includes a substantially flat annular end surface extending between the outer peripheral surface of said second cylindrically-shaped cavity and the outer peripheral surface of said disk-shaped body, the width of said flat annular end surface being sufficient to abut the end surfaces of fluid filters of at least two different diameter sizes;

(g) a central wall section situated within said disk-shaped body between said first and second cavities for preventing the passage of fluid between said cavities;

(h) a central bore coaxially situated within and extending through said disk-shaped body between said first and second cavities, said central wall section including a cylindrically-shaped portion surrounding said central bore, said central bore being adapted for receiving a hollow nipple having an internally-threaded portion, the hollow nipple being adapted for aligning said disk-shaped body with the fluid reservoir of the hydraulic system, the hollow nipple having an externally-threaded portion situated outside said central bore and extending beyond the second end surface of said disk-shaped body, the externally-threaded portion of the nipple being adapted for engagement with a fluid filter, the hollow nipple securing the fluid filter and the coupling adapter to the fluid reservoir of the hydraulic system;

(i) an outlet port extending from the outer peripheral surface of said disk-shaped body and through said body into said first cavity, said outlet port being situated between said first and second spaced-apart end surfaces; and (j) an inlet port extending from the outer peripheral surface of said disk-shaped body and through said body into said second cavity, said inlet port being spaced apart from said outlet port and being situated between said first and second spaced-apart end surfaces, the distance between the innermost wall portions of the passageways of said outlet and inlet ports at the points of entry into said first and second cylindrically-shaped cavities being greater than the diameter of the cylindrically-shaped portion of said central wall section surrounding said central bore, the distance between the outermost wall portions of the passageways of said outlet and inlet ports at the points of entry into said first and second cylindrically-shaped cavities being substantially equal to the diameters of said first and second cavities, said outlet and inlet ports being adapted for coupling the adapter to a remotely located fluid circulation device.

2. The coupling adapter as defined by claim 1 wherein said central wall section between said first and second cavities further includes a relatively thin, flat portion located between the points of entry of said outlet and inlet ports into said first and second cavities, respectively, said thin, flat portion lying in a plane substantially parallel to said first and second spaced-apart end surfaces, and an opening extending through the thin, flat portion of said central wall section, said opening being adapted for the passage of fluid between said first and second cavities.

3. The coupling adapter as defined by claim 2 further comprising a valve means situated within a portion of said second cylindrically-shaped cavity at a position adjacent to said opening, said valve means being adapted for closing said opening, thereby controlling the flow of fluid therethrough.

4. The coupling adapter as defined by claim 3 wherein said opening through the thin, flat portion of said central wall section is circular and wherein said valve means includes a spherically-shaped ball means and spring for closing said circular opening.

5. The coupling adapter as defined by claim 4 wherein said ball means and spring are situated within a cylindrically-shaped opening, the axis of which is parallel to and laterally displaced from the axis of said central bore, said cylindrically-shaped opening being situated below said circular opening and lying wholly within said second cylindrically-shaped cavity, said cylindrically-shaped opening providing at least two diametrically-disposed side opening positions into said second cavity to permit fluid flowing over the top surface of said ball means to enter said second cavity through said diametrically-disposed side opening positions.

6. The coupling adapter as defined by claim 5 wherein said valve means is responsive to the temperature of the fluid within said cylindrically-shaped opening and surrounding said valve means for controlling the rate of flow of the fluid through said circular opening.

7. The coupling adapter as defined by claim 6 wherein said spring comprises a cylindrically-shaped sealed bellows, said sealed bellows expanding longitudinally with increases in temperature to provide increased force upon said ball means thereby reducing the rate of flow of fluid through said circular opening as the temperature of the fluid increases.

8. A coupling adapter for attachment to the fluid reservoir of a hydraulic system for coupling a fluid filter and a remotely located fluid circulation device to the hydraulic system, comprising in combination:

(a) a generally disk-shaped body having first and second spaced-apart end surfaces, the first end surface being adapted for abutment adjacent the outlet surface of the fluid reservoir in place of a fluid filter, the second end surface being adapted for abutment adjacent the end surface of a fluid filter;

(b) a first cylindrically-shaped cavity extending partially into said disk-shaped body from said first end surface;

(c) at least two spaced-apart concentric ridges of different diameters formed at the first end surface of said disk-shaped body, one of said ridges being adjacent to the outer peripheral surface of said first cavity, the other of said ridges being adjacent to the outer peripheral surface of said disk-shaped body;

(d) a circular groove situated between said two spaced-apart concentric ridges and extending partially into said disk-shaped body from the first end surface;

(e) a second cylindrically-shaped cavity extending partially into said disk-shaped body from said second end surface;

(f) a central wall section situated within said disk-shaped body between said first and second cavities for preventing the passage of fluid between said cavities;

(g) a central bore coaxially situated within and extending through said disk-shaped body between said first and second cavities, said central wall section including a cylindrically-shaped portion surrounding said central bore, said central bore being adapted for receiving a hollow nipple having an internally threaded portion, the hollow nipple being adapted for aligning said disk-shaped body with the fluid reservoir of the hydraulic system, the hollow nipple having an externally threaded portion situated outside said central bore and extending beyond the second end surface of said disk-shaped body, the externally threaded portion of the nipple being adapted for engagement with a fluid filter, the hollow nipple securing the fluid filter and the coupling adapter to the fluid reservoir of the hydraulic system;

(h) an outlet port extending from the outer peripheral surface of said disk-shaped body and through said body into said first cavity, said outlet port being situated between said first and second spaced-apart end surfaces;

(i) an inlet port extending from the outer peripheral surface of said disk-shaped body and through said body into said second cavity, said inlet port being spaced apart from said outlet port and being situated between said first and second spaced-apart end surfaces, the distance between the innermost wall portions of the passageways of said outlet and inlet ports at the points of entry into said first and second cylindrically shaped cavities being greater than the diameter of the cylindrically-shaped portion of said central wall section surrounding said central bore, the distance between the outermost wall portions of the passageways of said outlet and inlet ports at the points of entry into said first and second cylindrically-shaped cavities being substantially equal to the diameters of said first and second cavities, said outlet and inlet ports being adapted for coupling the adapter to a remotely located fluid circulation device, said central wall section between said first and second cavities further including a relatively thin, flat portion situated between the points of entry of said outlet and inlet ports into said first and second cavities, respectively, said thin, flat portion lying in a plane substantially parallel to said first and second spaced-apart end surfaces;

(j) an opening extending through the thin, flat portion of said central wall section separating said first and second cavities, said opening being adapted for the passage of fluid between said cavities; and (k) valve means situated within a cylindrically-shaped chamber adjacent said opening for controlling the flow of fluid between said first and second cavities, said cylindrically shaped chamber lying wholly within said second cylindrically-shaped cavity and providing at least two diametrically disposed opening positions into said second cavity, the axis of said cylindrically-shaped chamber being parallel to and laterally displaced from the axis of said central bore, said valve means including a ball means and a sealed bellows spring, said sealed bellows spring being responsive to the temperature of the fluid within said cylindrically-shaped chamber and surrounding said bellows spring for controlling the rate of flow through said opening.

* * * * *